(12) United States Patent
Beyer

(10) Patent No.: US 8,409,039 B2
(45) Date of Patent: Apr. 2, 2013

(54) DUAL STAGE CLUTCH

(76) Inventor: Mark Beyer, Waterford, MI (US)

( * ) Notice: Subject to any disclaimer, the term of this patent is extended or adjusted under 35 U.S.C. 154(b) by 440 days.

(21) Appl. No.: 12/398,446

(22) Filed: Mar. 5, 2009

(65) Prior Publication Data
US 2009/0227404 A1 Sep. 10, 2009

Related U.S. Application Data

(60) Provisional application No. 61/034,730, filed on Mar. 7, 2008.

(51) Int. Cl.
F16H 59/00 (2006.01)
(52) U.S. Cl. .......................................................... 474/14
(58) Field of Classification Search .................... 474/14, 474/13, 11, 8, 70, 69, 46; 192/105 C, 105 CS, 192/103 A
See application file for complete search history.

(56) References Cited

U.S. PATENT DOCUMENTS

| 3,727,478 | A | | 4/1973 | Erickson et al. |
| 5,514,040 | A | * | 5/1996 | Robert ............................ 474/13 |
| 5,529,544 | A | | 6/1996 | Berto |
| 6,346,056 | B1 | | 2/2002 | Nouis et al. |
| 6,379,274 | B1 | * | 4/2002 | Robert ............................ 474/19 |

* cited by examiner

Primary Examiner — Michael Mansen
Assistant Examiner — Juan Campos, Jr.
(74) Attorney, Agent, or Firm — Dickinson Wright PLLC

(57) ABSTRACT

Continuously variable speed drive (CVT) have improved performance due to use of two groups of flyweight cams, each group being mounted on separate rotational members of a centrifugal clutch. One set of flyweight cams provides force to close the sheaves through the entire movement of the shift, whereas the other set of flyweight cams provides force only through an initial portion of the shift and then signs off. This provides a two stage shift behavior for the CVT that enhances power transfer to the driven pulley.

27 Claims, 4 Drawing Sheets

DUAL STAGE CLUTCH

CROSS-REFERENCE TO RELATED APPLICATIONS

The present application claims priority from U.S. Provisional Patent Application Ser. No. 61/034,730, filed Mar. 7, 2008, and entitled "Dual Stage Clutch", which is hereby incorporated by reference.

TECHNICAL FIELD

The present invention relates generally to clutch mechanisms. More particularly, the present invention relates to a clutch mechanism that provides a variable diameter for driving of an endless belt and which is adapted for use in connection with a high performance engine.

BACKGROUND INFORMATION

One class of conventional continuously variable transmissions (or "CVT's") has two tapered-faced pulleys interconnected with a belt of essentially fixed length. The sheaves of each pulley are able, under control, to move axially. The pulley on one shaft is connected to the crankshaft of the engine. The system including the pulley, and its ancillary parts, that is connected to the engine is called the driving, driver, or primary clutch. The other pulley is connected through a linkage to the drive train of a vehicle. This other pulley and its related parts, is called the driven or secondary clutch. Of necessity, when the sheaves of either pulley are close together, the associated belt must be located at a relatively large radius (distant from the axis of rotation of the pulley) and when the sheaves of a pulley are far apart, the associated belt must be located at a relatively small radius (close to the axis of rotation of the pulley).

Typically, because of the essentially fixed length of the belt, when the sheaves of one pulley are far apart, then the sheaves of the other pulley must be close together. Larger shift ratios, characteristic of slower vehicle speeds, occur when the sheaves of the primary pulley are far apart and the sheaves of the secondary pulley are close together. With this configuration, the rotational speed of the primary pulley is greater than the rotational speed of the secondary pulley. Smaller shift ratios, characteristic of higher vehicle speed, occur when the sheaves of the primary pulley are close together and the sheaves of the secondary pulley are far apart. With this configuration, the rotational speed of the primary pulley is less than the rotational speed of the secondary pulley.

Ordinarily, the primary clutch has a compression spring, or the like, tending to push the sheaves apart such that, at rest, the sheaves of the primary pulley have opened to allow the belt to lie close to the pulley's rotational axis, effecting a large shift ratio. Such a belt position at rest results in the engine having a desirable minimal load at the start of driving. The force produced by this spring increases as the sheaves of the primary pulley get closer together (lower shift ratios) and further compress the spring. Other parts of the primary clutch include a set of pivoting flyweights on the primary clutch pushing on a roller, or the like, linked such that the sheave spacing, and thus shift ratio, is responsive to speed and torque needs of the secondary clutch.

In the known CVT systems, the net result of the spring and flyweights of the primary clutch provide some beneficial results. Specifically, these CVT systems yield a primary pulley belt side force that is sufficient to allow the engine to start and promptly get up to approximately a rotational speed where the engine can deliver maximum power to its shaft. These CVT systems also yield a belt side force that increases with increasing vehicle speed (decreasing shift ratio) to a peak. Another benefit of these CVT systems is that they provide a belt side force that decreases with increasing vehicle speed.

An undesirable result of these CVT systems is a tendency to lose power because of belt slippage due to insufficient belt side force while the vehicle is accelerating to near maximum speed. A desirable result of the just described belt side force is a tendency for the system to increase the shift ratio (deliver more torque) when the vehicle slows down.

The typical role of the engine is to start, to accelerate promptly to a high rotational speed where the engine can deliver approximately its maximum power, and to remain at that high speed delivering approximately a constant amount of power. Power, in this context, is the product of torque and rotational velocity (expressed as $P=\tau \times \omega$, where P is power, $\tau$ is torque, and $\omega$ is rotation velocity). The role of the CVT is to apportion the power delivered by the engine into a torque and speed portion depending on the vehicle's speed. When the vehicle is moving slowly, the CVT has a high shift ratio, and the torque factor is relatively large. When the vehicle is moving rapidly, the CVT has a smaller shift ratio, and the torque factor is smaller.

It is known to use a clutch having a plurality of flyweights pivotally mounted on a single rotatable member, with the flyweights arranged to move radially outward with increasing rotational velocity of the shaft. For additional details, refer to U.S. Pat. No. 3,727,478 to Erickson.

U.S. Pat. No. 5,529,544 to Berto is another example of a system having a plurality of flyweights pivotally mounted on a single rotatable member. Specifically, this patent teaches a clutch having speed responsive means consisting of two sets of flyweights having different size, shape and/or weights. One of the first set of flyweights and one of the second set of flyweights are positioned side-by-side and have the same axis of rotation. The first and second sets of flyweights operate simultaneously by exerting an initial displacement force against the moveable sheave. Then, at a predetermined rotational speed of the drive clutch or predetermined position of the second set of flyweights, the flyweights of the second set are prevented from exerting force on or further displacing the moveable sheave. Thus, for rotational speeds greater than the preselected rotational speed, the first set of flyweights act alone in displacing the moveable sheave.

while the clutch disclosed in Berto yields some benefits, it still suffers from significant disadvantages. For example, due to the side-by-side arrangement of the first and second set of flyweights, the mass of the flyweights is limited due to space constraints and structural integrity constraints. Because of the limited mass of the flyweights, this arrangement cannot provide sufficient force necessary to perform the function of today's high performance engines.

SUMMARY OF THE INVENTION

In general terms, the present invention provides an improved centrifugal clutch the structure of which permits its use with engines having different performance characteristics, and enables simple modification resulting in a desired performance relationship with the selected engine and different operating environments.

One advantage of the present invention centers on two sets of flyweights or cam arms, each set consisting of a plurality of flyweights that are mounted on a separate rotatable member of the clutch such that each set of flyweights has a different axis of rotation. The flyweights each have an engageable cam surface that relates engine revolutions-per-minute to the input/output revolution ratio to effect a simulated gear shifting transmission characteristic.

Another advantage of the present invention is directed to flyweights made of different materials and weights to obtain a desired centrifugal action, and the mounting of flyweights having predetermined centers of mass to obtain the greatest mechanical advantage at the optimum time during the shifting process and variable ratio of the transmission. One of the sets of the flyweights is mounted in a manner to create a supplemental dual force to help eliminate belt slippage during high load use.

It is still another advantage of the present invention to provide an improved centrifugal clutch that imparts increased force at inertial shift.

It is yet another advantage of the present invention to provide an improved centrifugal clutch that affords increased performance for high performance engines, including lower RPM higher horsepower engines, due to the application of more force than by prior clutch mechanism.

Embodiments of the present invention use flyweights on two distinct rotatable members of the clutch that lie in two different parallel planes. The utilization of flyweights on two separate members creates massive adjustable force in the first ¼ to ¾ of the shift then signs off or stops engagement letting the flyweights on only one of the members to complete the shifting of the sheaves. This is a significant improvement over prior clutches that use only flyweights on one rotating member.

These and other features and advantages of this invention will become more apparent to those skilled in the art from the detailed description of a preferred embodiment. The drawings that accompany the detailed description are described below.

DETAILED DESCRIPTION

Figure 1:
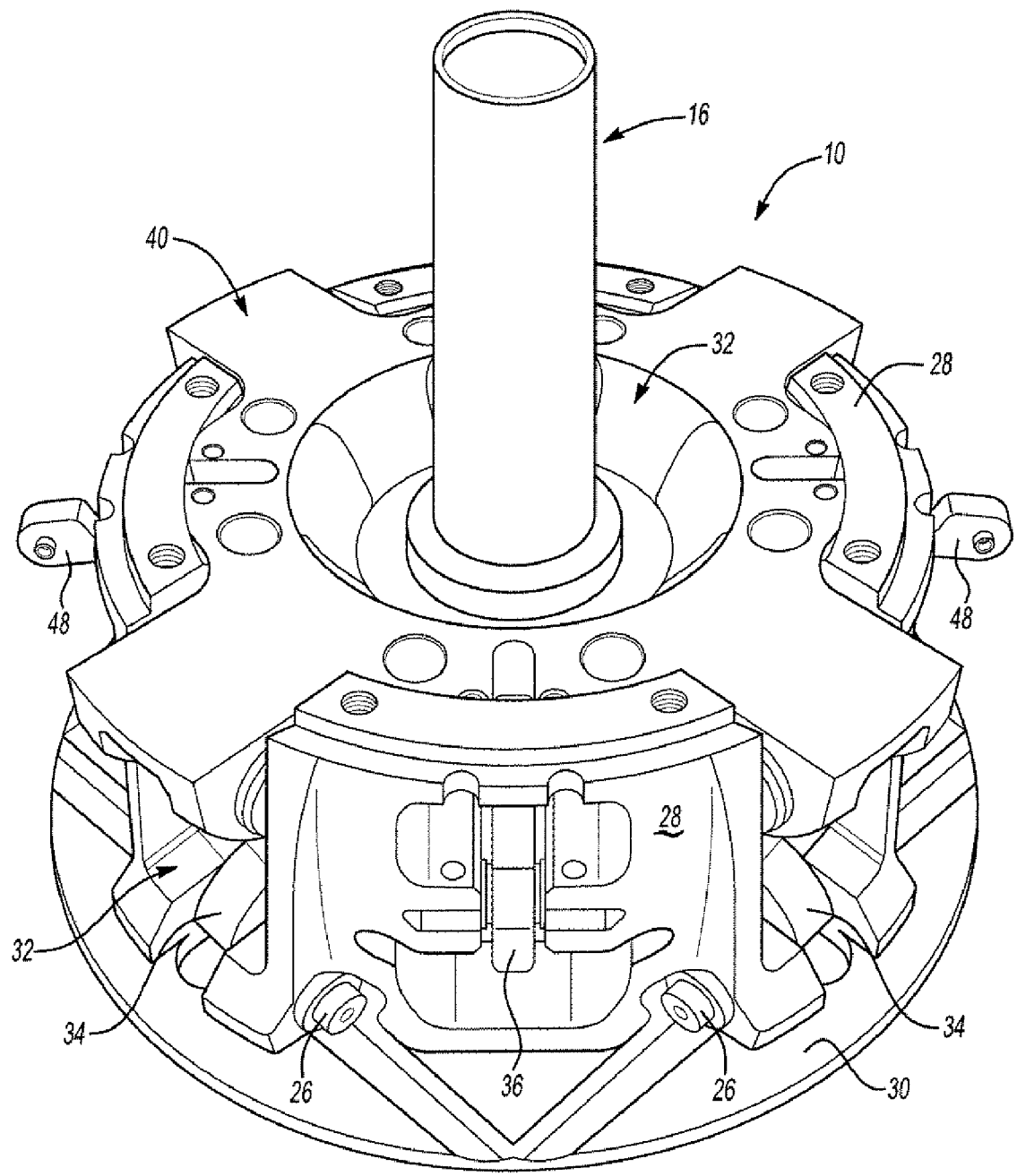
FIG. 1 is a perspective view of a dual stage primary clutch according to an embodiment of the present invention.

The disclosure is directed to an improved centrifugal clutch the structure of which permits its use with engines having different performance characteristics, and enables simple adjustable modification resulting in a desired performance relationship with the selected engine and different operating environments. One feature centers on the inclusion of a plurality of flyweights, each having an engageable cam surface that relates engine revolutions-per-minute to the input/output revolution ratio to effect a simulated gear shifting transmission characteristic. Other features are directed to flyweights made of different materials and weights to obtain the proper centrifugal action, and the mounting of flyweights having predetermined centers of mass to obtain the greatest mechanical advantage at the optimum time during the shifting process and variable ratio of the transmission, as is well known. Still another feature includes flyweights mounted in a manner to create a supplemental dual force to help eliminate belt slippage during high load use by providing a non-linear characteristic of the force used to compress the spring in the clutch.

The improved centrifugal clutch of the present invention is intended for use in applications utilizing high performance engines with continuously variable transmission belt driving systems. These CVT systems are known in the art to be used in many different types of vehicles, such as snowmobiles, golf carts, go-karts, all terrain vehicles, riding lawn mowers, electric-powered cars, and the like. These systems are also known to be used on many different types of machines used in the manufacturing and service industries. The present invention can also be utilized in connection with other types of vehicles or machines.

Two-stroke and four-stroke engines that commonly use variable speed transmission belt driving systems operate more efficiently in a known power region where the engine delivers optimum power. The lower gear ratio of these typical variable speed transmissions occurs where the transmission belt is near the bottom of the sheaves of the driving clutch and near the outer edges of the sheaves of the driven clutch. In the low gear ratio period, the CVT is generally inefficient. The high gear ratio occurs where the belt is near the outer edges of the driving clutch and near the bottom of the sheaves of the driven clutch. The high and low gear ratios are known and can vary as will be appreciated by one of ordinary skill in the art.

The present invention relates to a driving clutch 10 for a continuously variable belt driving system. As is known, the system is connected between a horizontal shaft that is in communication with an engine. As discussed in more detail below, the driving clutch 10 is mounted on the engine drive shaft to cause rotation thereof. The system also includes a driven clutch mounted on a driven shaft that is rotatably mounted to the vehicle such that it is parallel to the drive shaft. An endless drive belt connects the driving clutch 10 to the driven clutch to effectuate rotation thereof, as is well known in the art.

With reference to the Figures, in accordance with one embodiment, the driving clutch 10 includes a fixed sheave 12 and a moveable sheave 14. The driving clutch 10 is mounted in any of a variety of known suitable methods such that the fixed sheave 12 is located inboard (closer to the engine) of the movable sheave 14. The fixed sheave 12 is secured to a post 16 at a bottom end 18 thereof. The moveable sheave 14 is disposed on the post 16 such that it is axially moveable toward and away from the fixed sheave 12, as discussed in more detail below. The sheaves each have tapered faces as is known in the art. The post 16 has a lower portion 20 having a first diameter ($d_1$) and a middle portion 22 having a second diameter ($d_2$) that is smaller than the first diameter ($d_1$). The post 16 also includes an upper portion 24 with a third diameter ($d_3$) that is smaller than the second diameter ($d_2$). The bottom end 18 of the post 16 engages the drive shaft to effectuate rotation of the post 16 and the sheaves 12, 14. The post 16 can obviously have a variety of different shapes and configurations.

The moveable sheave 14 includes a plurality of primary rollers 26 located thereon. The primary rollers 26 are disposed radially about the circumference of the moveable sheave 14. In one preferred embodiment, each primary roller 26 is secured between a pair of adjacent tower portions 28 that extend upwardly from a base portion 30 of the moveable sheave 14. When secured in place, each primary roller 26 spans an opening 32 formed between adjacent tower portions 28. This configuration provides structural support for the primary rollers 26 and minimizes failure when a flyweight is disposed thereon, as discussed in more detail below. In accordance with one embodiment, the moveable sheave 14 has four primary rollers 26 equally spaced about its periphery. However, it will be understood that the number of primary rollers and attached flyweights can vary as required.

Each primary roller 26 has a primary flyweight 34 rotatably coupled thereto. Each primary flyweight 34 has a head portion 60 through which a respective primary roller 26 passes and a body portion 62 extending from the head portion 60. The body portion 62 includes a cam surface 80. Each of the primary rollers 26 defines an axis of rotation for the attached primary flyweight 34 and the axis of rotation for each of the primary flyweights 34 lies in the same horizontal plane. This horizontal plane is oriented perpendicular to an axis of rotation of the post 16 and engine drive shaft. Each primary flyweight 34 is positioned on a respective primary roller 26 such that it can pivot within an opening 32 between adjacent towers 28 as the clutch 10 rotates. The plurality of primary flyweights 34 assist in moving the moveable sheave 14 in increasing amounts in response to increasing rotational speed of an associated drive shaft, as will be discussed in more detail below.

Each of the tower portions 28 also includes a secondary roller 36 secured thereto. The secondary rollers 36 are secured to an individual tower portion 28 to ensure their structure stability and integrity. In a preferred embodiment, there are four secondary rollers 36 uniformly spaced around the periphery of the moveable sheave 14. However, more or less secondary rollers 36 may be included as desired.

In accordance with a preferred embodiment, the driving clutch 10 also includes a spider assembly 40. The spider assembly 40 is a separate component from the moveable sheave 14 and includes a plurality of spokes 42. Each of the spokes 42 extends radially outwardly from a center portion 44. Each of the spokes 42 is received within one of the openings 32 between the adjacent towers portions 28 such that the spider assembly 40 is retained in place as the clutch 10 and thus the primary sheave 12 and the moveable sheave 14 rotate. Each of the spokes 42 of the spider assembly 40 includes a spider roller 46 disposed in an underside thereof. As each spider roller 46 spans an opening 32, it can engage an or contact a respective cam surface 80 of one of the flyweights 34 as it pivots.

The spider assembly 40 also includes a plurality of secondary flyweights 48 that extend outwardly from the center portion 44. The secondary flyweights 48 are positioned on the spider assembly 40 between the spokes 42 and are intended to contact a respective one of the secondary rollers 36. The secondary flyweights 48 have a head portion 64 that is pivotally secured to the spider assembly 40 and a body portion 66 that extends outwardly therefrom. The body portion 66 of the secondary flyweight 48 also includes a cam surface 82 that engages the secondary roller 36. The spider assembly 40 is positioned such that the secondary flyweights 48 pass through an opening in a respective tower portion 28 with the cam surface 82 engaging an upper side of the secondary roller 36.

The secondary flyweights 48 also assist in urging the moveable sheave 14 in increasing amounts in response to increasing rotational speed of the drive shaft. The secondary flyweights 48 are located on a separate member (the spider assembly 40) from the primary flyweights 34 (the moveable sheave 14). The secondary flyweights 48 also have a respective axis of rotation that all lie in the same horizontal plane. The plane in which the axis of rotation of the secondary flyweights 48 lie is parallel to the plane of the axis of rotation of the primary flyweights 34. Thus, the primary flyweights 34 lie generally in a first plane and the secondary flyweights 48 lie in a second plane, which planes are parallel to one another and lie perpendicular to the axis of rotation of the clutch 10. A cover 50 is attached to the tower portions 28 and engage the post 16 for axial movement.

Figure 2:
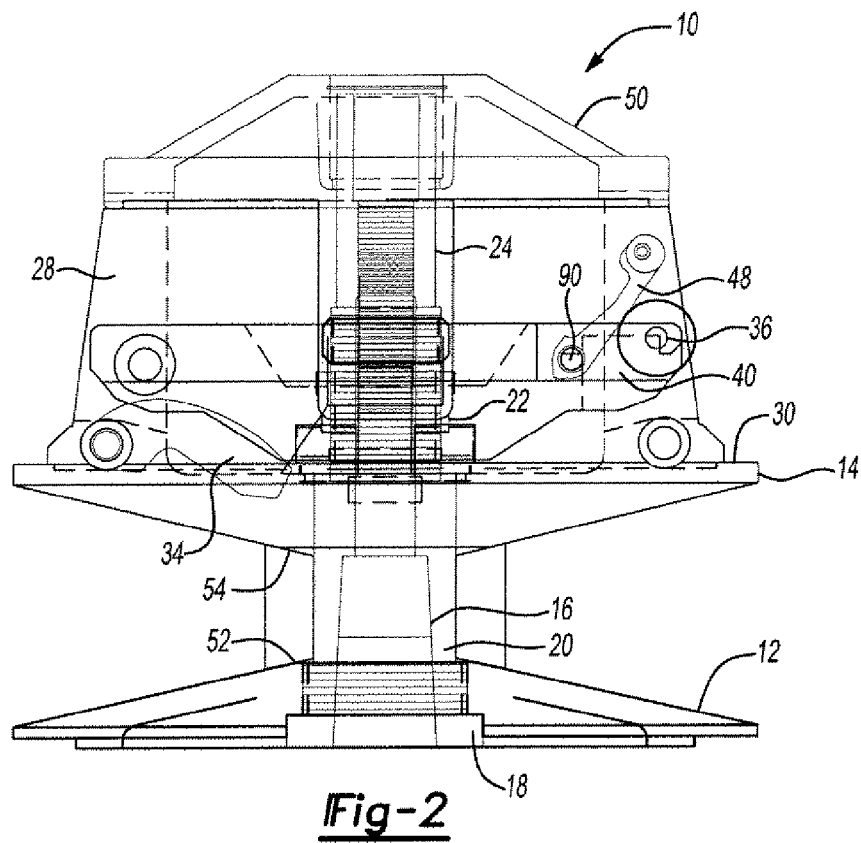
FIG. 2 shows a sectional view of a dual stage primary clutch according to an embodiment of the present invention, with the clutch in a first position of engagement at the start of shifting.

Referring to FIG. 2, a dual stage primary clutch 10 is shown in section in a first position of engagement at the start of shifting. In this position, the fixed sheave 12 and the moveable sheave 14 are spaced apart their maximum distance. In this position, the engine is operating in a low gear and the belt is positioned near the inner portions 52, 54 of the sheaves 12, 14. When the clutch 10 is operating at shift start, the cam surface 80 of the primary flyweights 34 engage or contact a respective spider roller 46. Also, the primary flyweights 34 are positioned such that the body portion 62 extends inwardly and is oriented generally horizontally. In this position, the secondary or supplemental flyweights 48 engage a moveable secondary roller 36 disposed on the moveable sheave 14. As shown, the supplemental flyweights 48 are angled slightly upwardly. Both the primary flyweights 34 and the secondary flyweights 48 are shown at the beginning of their pivot at the beginning of the shift. It will be appreciated by one of ordinary skill in the art that each of the primary flyweights 34 and the secondary flyweights 48 operate together such that a description of the structure, operation, and position of one individual flyweight applies to the remainder of flyweights in that set. A spring biases the fixed sheave 12 and the moveable sheave 14 away from one another.

Figure 3:
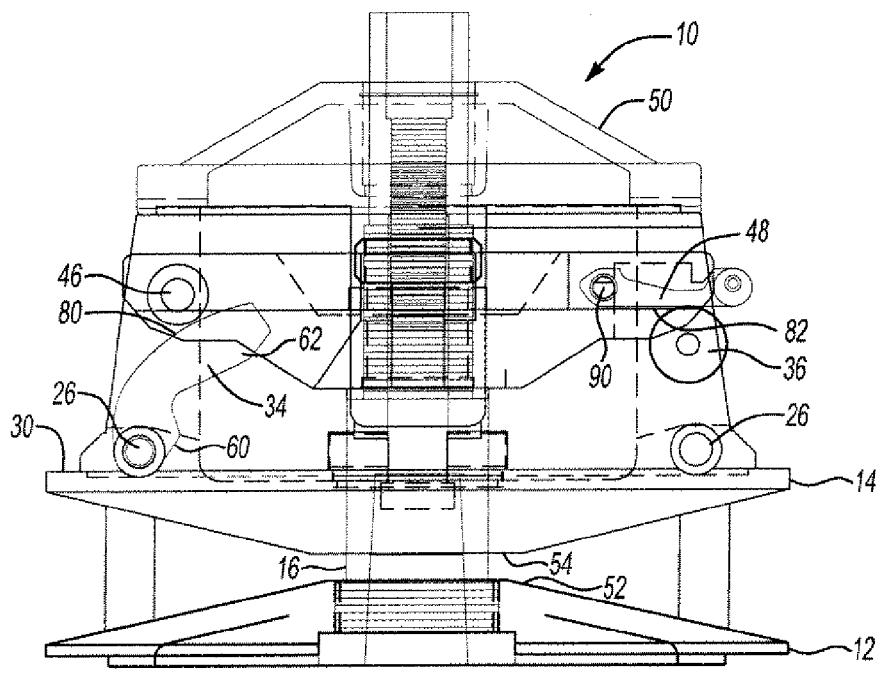
FIG. 3 shows a sectional view of a dual stage primary clutch according to an embodiment of the present invention, with the clutch in a second position at a transition point between a first stage of shifting and a second stage of shifting.

Referring to FIG. 3, the dual stage primary clutch 10 is shown in a second position at a transition point between a first stage of shifting and a second stage of shifting. In this position, the primary flyweights 34 are shown as being about 75% of the way through their pivot movement. As the primary flyweights 34 pivot such that the body portion 62 and cam surface 80 moves upwardly in contact with spider roller 46, the cam surfaces 82 on the body portions 48 remain in contact with a respective moveable roller 36 moving downwards, and together urge the moveable sheave 14 downward against the force of the spring. As shown, the secondary flyweights 48 have at this point moved through their entire pivot movement such that they extend outwardly in a generally horizontal direction. While the completion of this stage is illustrated at 75% rotation of the primary flyweights 34, the clutch 10 can be configured to occur anywhere between 25%-75% rotation of the primary flyweight.

As the moveable sheave 14 travels toward the fixed sheave 12, the spider assembly 40 moves further apart from the moveable sheave 14. This is due to the pivoting of the primary flyweights 34 and their engagement with the spider rollers 46. Additionally, at this speed of rotation, the centrifugal force has caused the secondary flyweights 48 to rotate about their pivot bar 90. Up to this point (rotational speed), the secondary flyweights 48 apply an additional downward force on the moveable sheave 14. As can be seen, at this position, the secondary flyweights arms 48 have pivoted throughout their full range and cannot pivot any further. The secondary flyweights 48 are no longer in contact with the secondary roller 36 and thus applies no additional downward force. Thus, as the rotational velocity of the shaft increases, the primary cam arm 34 continues to pivot through the remainder of the shift action of the clutch 10 and is the only flyweight applying any force to the moveable sheave 14.

Figure 4:
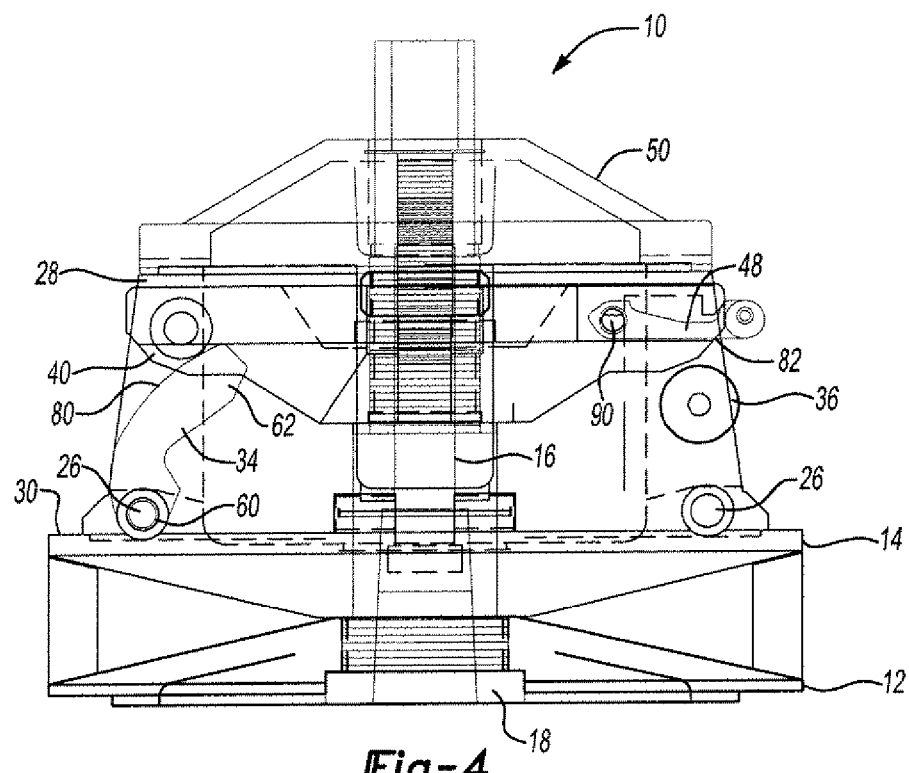
FIG. 4 shows a sectional view of a dual stage primary clutch according to an embodiment of the invention, with the clutch in a third position at the end of shifting.

Referring now to FIG. 4, the dual stage primary clutch 10 is illustrated in a final position. In this position, the primary flyweights 34 have pivoted through their full range of travel. As shown, the cam surfaces 80 of the primary flyweights 34 are still in contact with and apply a downward force on the primary rollers 46. Also, the secondary flyweights 48 are in the same position as they were in FIG. 3 and are no longer in contact with the secondary roller 36.

Figure 5:
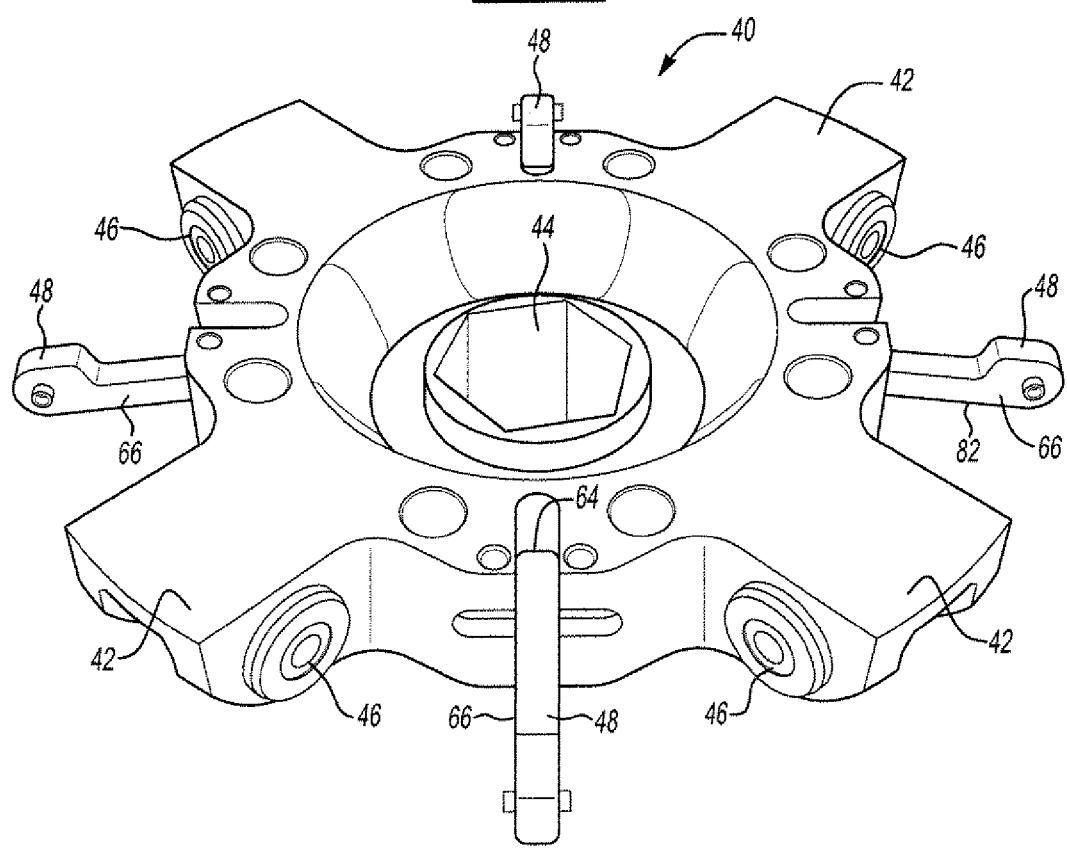
FIG. 5 shows a perspective view of a spider assembly for use in an embodiment of the present invention.

Referring to FIG. 5, a spider assembly 40 of the clutch 10 is shown separate from the rest of the clutch 10. In this view, the parts of the spider assembly 40 can easily be seen, including the center portion 44 of the spider assembly 40, the secondary flyweights 48, and the spider rollers 46. The cam surfaces 82 of the secondary flyweights 48 engage the secondary rollers 36 mounted on the moveable sheave assembly 14 (see FIG. 4). The spider rollers 46 engage the primary flyweights 34 mounted on the moveable sheave assembly 14 (see FIG. 4).

Figure 6:
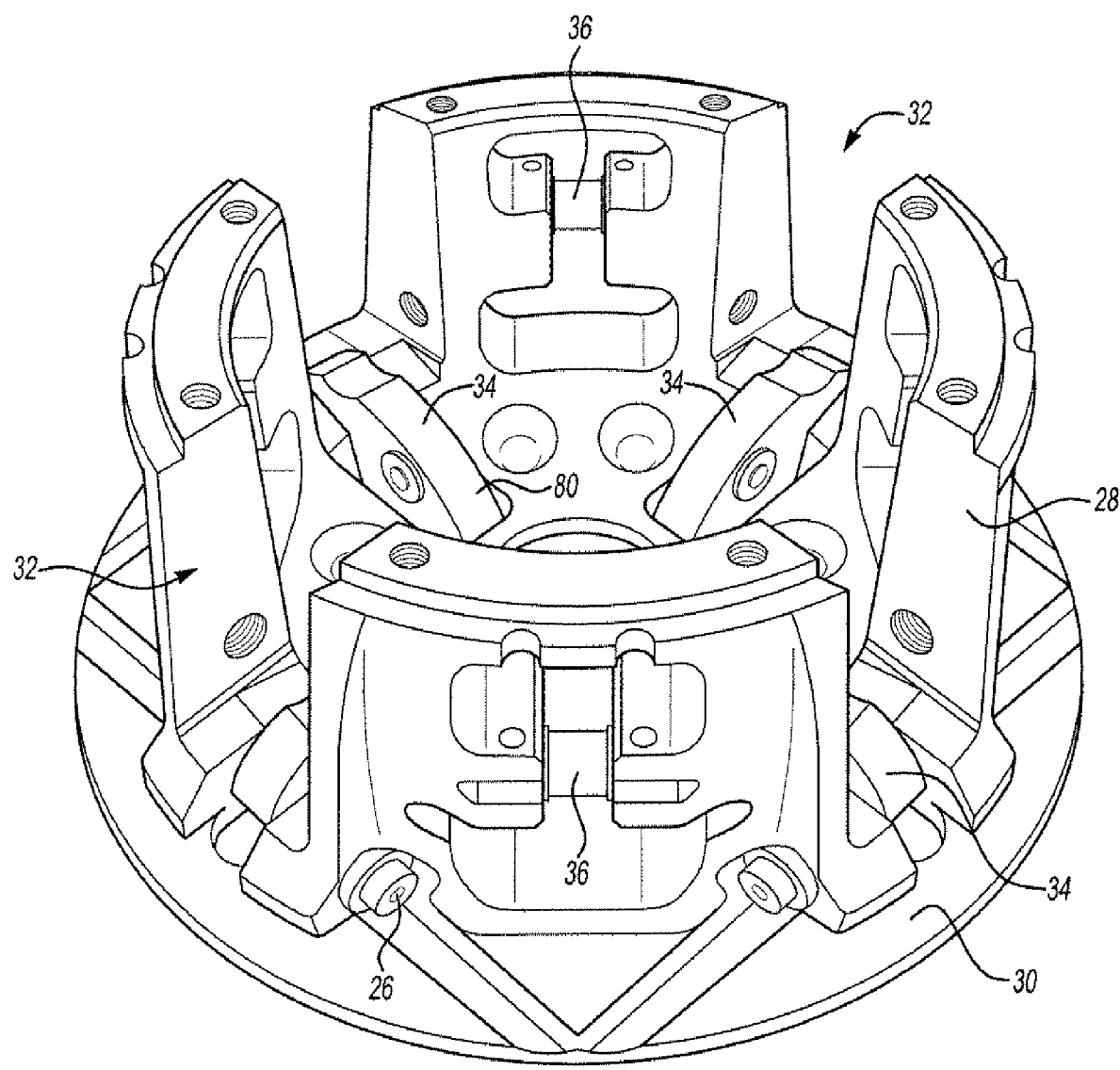
FIG. 6 shows a perspective view of a moveable sheave assembly for use in an embodiment of the present invention.

Referring to FIG. 6, the moveable sheave 14 is shown detached from the rest of the clutch 10. In this view, the parts of the moveable sheave 14 can easily be seen, including the base portion 30, the primary flyweights 34, the primary rollers 26, and the secondary rollers 36. The cam surfaces 80 of the primary flyweights 34 engage the spider rollers 46 mounted on the spider assembly 40. The secondary rollers 36 engage the secondary flyweights 48 mounted on the spider assembly 40.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A variable ratio centrifugal clutch driving assembly for use in a continuously variable transmission to connect with a driven assembly by means of an endless belt, the clutch driving assembly comprising:
    a rotatable shaft;
    a first rotatable member comprising a first sheave mounted on the shaft for rotation therewith and axially stationary thereon;
    a second rotatable member comprising a second sheave mounted on the shaft for rotation therewith and axially movable relative to the first sheave to variably control the radial position of the endless belt disposed therebetween;
    a third rotatable member mounted on the shaft for rotation therewith and axially stationary thereon;
    a first group of plural flyweights pivotally mounted on the second rotatable member and arranged to move radially outward with increasing rotational velocity of the shaft, each flyweight of the first group having formed thereon a first group cam surface to effect predetermined first and second modes of movement of the second sheave with respect to the first sheave, each of said first group cam surfaces being positioned to engage with a corresponding first group cam engaging member disposed on the third rotatable member to effect said first and second modes of movement; and
    a second group of plural flyweights pivotally mounted on the third rotatable member and arranged to move radially outward with increasing rotational velocity of the shaft, each flyweight of the second group having formed thereon a second group cam surface to effect only the predetermined first mode of movement of the second sheave with respect to the first sheave, each said second group cam surface being positioned to engage with a corresponding second group cam engaging member disposed on the second rotatable member to effect said first mode of movement.

2. The variable ratio centrifugal clutch driving assembly recited in claim 1, wherein the second group of plural flyweights pivot through only a portion of any axial movement of the second sheave relative to the first sheave.

3. The variable ratio centrifugal clutch driving assembly recited in claim 1, wherein the first group of plural flyweights pivot through the entirety of any axial movement of the second sheave relative to the first sheave and wherein the second group of plural flyweights pivot through less than the entirety of any axial movement of the second sheave relative to the first sheave.

4. A variable ratio centrifugal clutch driving assembly for use in a continuously variable transmission to connect with a driven assembly by means of an endless belt, the clutch driving assembly comprising:
    a rotatable shaft;
    a first rotatable sheave mounted on said shaft for rotation therewith, said first rotatable sheave being axially stationary on said shaft;
    a second rotatable sheave mounted on said shaft for rotation therewith, said rotatable sheave being axially movable relative to said first sheave to variably control the radial position of the endless belt disposed therebetween;
    a third rotatable member disposed on said shaft for rotation therewith;
    a first set of flyweights being pivotally mounted to said second rotatable sheave, said first set of flyweights each having an axis of rotation with each axis of rotation lying in a first horizontal plane, which is perpendicular to an axis of rotation of said rotatable shaft, each of said first set of flyweights having a cam surface that applies a force on said second rotatable sheave throughout an entire range of movement of said second sheave;
    a second set of flyweights being pivotally mounted to said third rotatable member, second set of flyweights each having an axis of rotation with each axis of rotation lying in a second horizontal plane, said second horizontal plane being parallel to said first horizontal plane, each of said second set of flyweights having a cam surface that contacts said second rotatable sheave to apply an additional force on said second rotatable sheave throughout a predetermined portion of said range of movement of said second sheave, where said predetermined portion is less than said entire range of movement of said second rotatable sheave;
    whereby said second set of flyweights are not in engagement with said second rotatable sheave for any portion of said entire range of movement beyond said predetermined portion.

5. The clutch assembly of claim 4, wherein said first set of flyweights are mounted on said second sheave.

6. The clutch assembly of claim 5, wherein said second set of flyweights are mounted on a rotatable spider assembly, which is a separate member from said second sheave.

7. The clutch assembly of claim 6, wherein said cam surfaces of said first set of flyweights engage a respective first roller assembly to effectuate application of said downward force on said second sheave by said first set of flyweights as they pivotally move in response to the varying rotational speed of said rotatable shaft.

8. The clutch assembly of claim 7, wherein said first roller assemblies are disposed on said spider assembly.

9. The clutch assembly of claim 8, wherein said cam surfaces of said second set of flyweights engage a respective second roller assembly to effectuate application of said downward force on said second sheave by said second set of flyweights throughout a predetermined amount of pivotal rotation of said first set of flyweights.

10. The clutch assembly of claim 9, wherein said second roller assemblies are disposed on said second sheave.

11. The clutch assembly of claim 4, wherein said axis of rotation of said first set of flyweights and said second set of flyweights are radially fixed with respect to said axis of rotation of said rotatable shaft.

12. The clutch assembly of claim 4, wherein said predetermined portion of said range of motion is less than an entirety of said range of motion of said second sheave.

13. A variable ratio centrifugal clutch driving assembly for use in a continuously variable transmission to connect with a driven assembly by means of an endless belt, the clutch driving assembly comprising:
    a rotatable shaft;
    a first sheave mounted on said shaft for rotation therewith;
    a second sheave mounted on said shaft for rotation therewith;
    said first sheave and said second sheave defining a distance therebetween, which distance is variable to control a radial position of the endless belt disposed therebetween;
    an additional rotatable member mounted on said shaft for rotation therewith;
    a first plurality of weights pivotally mounted on said second sheave and configured to pivot outwardly with increasing rotational velocity of the shaft, each weight of the first plurality of weights configured to effect predetermined first and second modes of movement of said second sheave with respect to said first sheave, each of said first plurality of weights configured to engage said additional rotatable member to effect said first and second modes of movement; and
    a second plurality of weights pivotally mounted on said additional rotatable member and configured to move radially outwardly with increasing rotational velocity of said shaft, each weight of said second plurality of weights configured to effect said predetermined first mode of movement of said second sheave with respect to said first sheave through engagement with said second sheave,
    whereby said first mode of movement is less than a total amount of movement of said second sheave with respect to said first sheave and whereby said first mode of movement and said second mode of movement together define said total amount of movement of said second sheave with respect to said first sheave;
    whereby said second set of flyweights do not effect said second mode of movement of said second sheave with respect to said first sheave.

14. The variable ratio centrifugal clutch driving assembly of claim 13, wherein said first sheave is axially fixed on said rotatable shaft.

15. The variable ratio centrifugal clutch driving assembly of claim 14, wherein said first plurality of weights are flyweights each having a cam surface that contacts a respective roller on said additional rotatable member.

16. The variable ratio centrifugal clutch driving assembly of claim 14, wherein said second plurality of weights are flyweights each having a cam surface that contacts a respective roller on said second sheave.

17. A variable ratio centrifugal clutch driving assembly for use in a continuously variable transmission to connect with a driven assembly through an endless belt, the clutch driving assembly comprising:
    a rotatable shaft;
    a first rotatable sheave mounted on said shaft for rotation therewith, said first rotatable sheave being axially stationary on said shaft;
    a second rotatable sheave mounted on said shaft for rotation therewith, said rotatable sheave being axially movable relative to said first sheave to variably control the radial position of the endless belt disposed therebetween;
    an additional rotatable member disposed on said shaft for rotation therewith;
    a first set of weights being pivotally mounted to said second rotatable sheave, said first set of weights each having a first axis of rotation with each axis of rotation lying in a first horizontal plane, which is perpendicular to an axis of rotation of said rotatable shaft, each of said first set of weights having a cam surface that applies a downward force on said second rotatable sheave throughout an entire range of movement of said second sheave, said first axis of rotation of said weights being radially fixed with respect to said axis of rotation of said shaft;
    a second set of weights being pivotally mounted to said additional rotatable member, second set of weights each having a second axis of rotation with each axis of rotation lying in a second horizontal plane, said second horizontal plane being parallel to said first horizontal plane, each of said second set of weights applying an additional downward force on said second rotatable sheave throughout a predetermined portion of said range of movement of said second sheave, said second axis of rotation being radially fixed with respect to said axis of rotation of said shaft.

18. The variable ratio centrifugal clutch driving assembly of claim 17, wherein each of said second set of weights includes a surface that contacts said second sheave.

19. The variable ratio centrifugal clutch driving assembly of claim 18, wherein said second group of weights consists of a plurality of flyweights each having a cam surface that contacts a roller on said second sheave.

20. The variable ratio centrifugal clutch driving assembly of claim 17, wherein said predetermined portion of said range of motion is less than an entirety of said range of motion of said second sheave.

21. The variable ratio centrifugal clutch driving assembly of claim 17, further comprising:
    an additional rotatable member mounted on the shaft for rotation therewith, said additional rotatable member being axially stationary on the shaft.

22. The variable ratio centrifugal clutch driving assembly of claim 21, wherein said first group of weights consists of a plurality of flyweights each having a cam surface that contacts a respective roller on said additional rotational member.

23. A variable ratio centrifugal clutch driving assembly for use in a continuously variable transmission to connect with a driven assembly by means of an endless belt, the clutch driving assembly comprising:
    a rotatable shaft;
    a first rotatable sheave mounted on said shaft for rotation therewith, said first rotatable sheave being axially stationary on said shaft;

a second rotatable sheave mounted on said shaft for rotation therewith, said rotatable sheave being axially movable relative to said first sheave to variably control the radial position of the endless belt disposed therebetween;

an additional rotatable member disposed on said shaft for rotation therewith;

a first plurality of weights being pivotally mounted to said second rotatable sheave, said first plurality of weights each having an axis of rotation with each axis of rotation lying in a first horizontal plane, which is perpendicular to an axis of rotation of said rotatable shaft, each of said first plurality of weights applies a force on said second rotatable sheave throughout an entire range of movement of said second sheave;

a second plurality of weights being pivotally mounted to said additional rotatable member, second plurality of weights each having an axis of rotation with each axis of rotation lying in a second horizontal plane, said second horizontal plane being parallel to said first horizontal plane, each of said second plurality of weights applies an additional force on said second rotatable sheave throughout a predetermined portion of said range of movement of said second sheave;

whereby each of said second plurality of weights does not engage said second sheave in any portion of said range of movement of said second sheave beyond said predetermined portion; and wherein said predetermined portion of said range of movement is less than an entirety of said range of movement of said sheave.

24. The clutch assembly of claim 23, wherein said predetermined portion of said range of movement is between 0% to 75%.

25. The clutch assembly of claim 23, wherein said predetermined portion of said range of movement is about 75%.

26. The variable ratio centrifugal clutch driving assembly of claim 23, wherein each of said second plurality of weights includes a surface that contacts said second sheave.

27. The variable ratio centrifugal clutch driving assembly of claim 23, wherein said second plurality of weights are flyweights each having a cam surface that contacts a respective roller on said second sheave.

* * * * *